United States Patent
Denk et al.

(10) Patent No.: US 7,928,620 B2
(45) Date of Patent: Apr. 19, 2011

(54) DEVICE FOR SAFEGUARDING AN UNINTERRUPTIBLE POWER SUPPLY OF A MAGNET BEARING IN THE EVENT OF FAILURE OF AN ELECTRICAL SUPPLY VOLTAGE

(75) Inventors: Joachim Denk, Nürnberg (DE); Dietmar Stoiber, Fürth (DE); Bernd Wedel, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 353 days.

(21) Appl. No.: 12/298,822

(22) PCT Filed: Mar. 16, 2007

(86) PCT No.: PCT/EP2007/052506
§ 371 (c)(1),
(2), (4) Date: Oct. 28, 2008

(87) PCT Pub. No.: WO2007/124983
PCT Pub. Date: Nov. 8, 2007

(65) Prior Publication Data
US 2009/0174270 A1 Jul. 9, 2009

(30) Foreign Application Priority Data
Apr. 28, 2006 (DE) .................... 10 2006 019 875

(51) Int. Cl.
*H02K 7/09* (2006.01)
*F16C 32/04* (2006.01)
*H02J 9/00* (2006.01)
*H02P 27/06* (2006.01)

(52) U.S. Cl. .......... 310/90.5; 361/143; 361/144; 307/68
(58) Field of Classification Search ................ 310/90.5; 361/143, 144; 307/68
See application file for complete search history.

(56) References Cited

U.S. PATENT DOCUMENTS

| 5,574,345 | A | * | 11/1996 | Yoneta et al. ................. 318/376 |
| 6,617,734 | B2 |   | 9/2003 | Taniguchi et al. |
| 7,109,622 | B2 | * | 9/2006 | Khalizadeh ................... 310/90.5 |
| 7,116,066 | B2 | * | 10/2006 | Lin ................................ 318/108 |
| 7,187,087 | B2 | * | 3/2007 | Khalizadeh ................... 290/1 R |
| 2009/0134705 | A1 | * | 5/2009 | Kalev .............................. 307/68 |
| 2009/0174270 | A1 | * | 7/2009 | Denk et al. .................... 310/90.5 |

FOREIGN PATENT DOCUMENTS
DE 43 06 307 A1 9/1994
DE 195 08 849 A1 8/1995
(Continued)

*Primary Examiner* — Quyen Leung
*Assistant Examiner* — David W. Scheuermann
(74) *Attorney, Agent, or Firm* — Henry M. Feiereisen; Ursula B. Day

(57) ABSTRACT

The invention relates to a device for safeguarding uninterrupted power supply of a magnetic bearing (5) in the event of a power supply voltage (U) failure. Said device comprises: a first frequency converter (2) which is supplied with power by the supply voltage (U) and controls a motor (3), and a transformer (7) which is connected to a rectifier (8) and the motor (3), said rectifier (8) supplying a DC-link electric circuit (11) of a second frequency converter (14) controlling the magnetic bearing (5) with power in the event of a power supply voltage failure. The invention allows prevention of damages to the magnetic bearing in the event of disruption of power supply of the magnetic bearing in the event of a power supply voltage failure.

11 Claims, 2 Drawing Sheets

FOREIGN PATENT DOCUMENTS

| | | |
|---|---|---|
| EP | 0 430 009 A1 | 6/1991 |
| EP | 0 535 916 A2 | 4/1993 |
| EP | 0 681 115 A2 | 11/1995 |
| EP | 0 825 702 A1 | 2/1998 |
| EP | 0 687 395 B1 | 11/1998 |
| WO | WO 96/42133 A1 | 12/1996 |

* cited by examiner

DEVICE FOR SAFEGUARDING AN UNINTERRUPTIBLE POWER SUPPLY OF A MAGNET BEARING IN THE EVENT OF FAILURE OF AN ELECTRICAL SUPPLY VOLTAGE

BACKGROUND OF THE INVENTION

The invention relates to a device for safeguarding an uninterruptible power supply of a magnet bearing in the event of failure of an electrical supply voltage.

The shafts of rapidly rotating motors are increasingly often mounted on contactless magnet bearings instead of conventional sliding or rolling bearings. A magnet bearing in this case always needs to be actively regulated.

In motors, in particular in motors of machine tools, production machines and/or robots, magnet bearings are used to an increasing extent for bearing a motor shaft or any desired other shaft which is driven by a motor. Increasingly often magnet bearings are used in particular for bearing spindles.

However, in contrast to conventional rolling body bearings, magnet bearings need to be continuously supplied with electrical energy in order to ensure a bearing arrangement in accordance with regulations. If the supply voltage of the magnet bearing fails, for example as a result of an electrical failure of the power supply system, not only will the motor run down, but also the functionality of the magnet bearing will no longer be provided. In order to avoid damage to the magnet bearing, the shaft and/or other components in the event of failure of the supply voltage of the magnet bearing when the motor is still rotating, in the case of conventional magnet bearings so-called emergency operation conditions are implemented mechanically which for a limited number of failures of the supply voltage of the magnet bearing still ensure an emergency bearing arrangement without the magnet bearing, the shaft or other components being damaged. However, applications of magnet bearings in fields with insufficiently stable electrical power supply systems are still problematic. The maximum permissible number of emergency operation rundowns of the magnet bearing is then quickly reached, with the result that the abovementioned components need to be replaced even after a relatively short period of time. This replacement is generally time-consuming and associated with high costs.

In the case of conventional machine tools, magnet bearing systems are known in which the drive units of the magnet bearing are supplied with electrical energy by the same converter DC-link circuit to which the remaining drive units of the machine tool are also connected. In the event of a power failure, the DC-link circuit can then be maintained in terms of energy from the energy of the rotating spindle. As a result, the spindle (rotating rotor) is braked and the magnet bearing at the same time retains its functionality without a so-called uninterruptible power supply system, for example in the form of a battery-buffered supply, being necessary for this purpose.

For example, the German laid-open specification DE 43 06 307 A1 has disclosed a method for preventing damage to numerically faulty machines in the event of failure of the power supply system. This document provides that the kinetic energy of a main spindle drive is fed back in regulated form to the DC-link circuit in the event of failure of the power supply system and program-controlled emergency retraction of the tool spindle is implemented.

Drive units for magnet bearings generally function with a DC-link circuit voltage of from 150V to 750V. This voltage range is technically referred to as "low voltage". Particularly high-power motors are often supplied with substantially higher voltages (for example 3 kV). If such a motor has a magnet bearing arrangement, the braking energy can no longer be transmitted directly from the DC-link circuit of the converter provided for driving the motor into the DC-link circuit of the converter of the drive unit for the magnet bearing.

Therefore, in particular in such cases, the uninterruptible power supply systems mentioned already at the outset are often used for safeguarding an uninterruptible power supply of the magnet bearing in the event of failure of the electrical supply voltage. An uninterruptible power supply system maintains the functionality of the magnet bearing arrangement, for example of a shaft, until the rotating shaft is braked to a sufficient extent and no damage or wear occurs during mounting in the emergency bearing arrangement.

However, uninterruptible power supply systems have a plurality of disadvantages:

Uninterruptible power supply systems represent a considerable cost factor in the case of magnet bearings.

Uninterruptible power supply systems take up a considerable amount of physical space.

In order to ensure the functionality of the batteries of an uninterruptible power supply system, certain environmental conditions such as temperature, air humidity etc. need to be adhered to.

The batteries need to be tested and maintained regularly.

SUMMARY OF THE INVENTION

The invention is based on the object of avoiding damage to the bearings when using a magnet bearing during an interruption in the power supply of the magnet bearing in the event of failure of the electrical supply voltage.

The object is achieved by a device for safeguarding an uninterruptible power supply of a magnet bearing in the event of failure of an electrical supply voltage, comprising:

a first converter, which is supplied with electrical energy by the supply voltage and drives a motor, and a transformer, which is connected to a rectifier and the motor, the rectifier, in the event of failure of the electrical supply voltage, supplying an electrical DC-link circuit of a second converter, which is used for driving the magnet bearing, with electrical energy.

In particular, the intention is for the invention to make it possible to be able to dispense with an uninterruptible power supply system which generally requires a battery in the case of different DC-link voltages of the converter for driving the motor and of the converter for driving the magnet bearing.

Advantageous developments of the invention are given in the dependent claims.

It has proven to be advantageous if electrical resistors are connected upstream of the transformer. As a result, in particular when using asynchronous motors, the transformer can be relieved of load in order to avoid premature saturation.

Furthermore, it has proven to be advantageous if a coil is connected in series between the rectifier and the electrical DC-link circuit. Effective smoothing of the output voltage generated by the rectifier can be achieved with the aid of the coil.

Furthermore, it has proven to be advantageous if the rectifier is in the form of an uncontrolled rectifier, since an uncontrolled rectifier can be implemented particularly easily.

In addition, it has proven to be advantageous if the transformer is dimensioned such that, given the maximum possible AC output voltage of the first converter, no saturation of the transformer occurs. This measure also makes it possible to safely avoid saturation of the transformer in the event of a high AC output voltage.

In addition, it has proven to be advantageous if the transformer is dimensioned such that, given the presence of the supply voltage, the voltage on the rectifier side of the transformer is below, in particular just below, the DC-link voltage of the second converter. As a result, it is possible to ensure that the DC-link circuit of the second converter is supplied with electrical energy via the rectifier only in the event of failure of the supply voltage.

In addition, it has proven to be advantageous if a power converter is connected between the rectifier and the DC-link circuit, the power converter being controlled such that, in the event of failure of the electrical supply voltage, the DC-link voltage remains constant for as long as possible. This measure makes it possible to maintain the DC-link voltage for a particularly long period of time for the purpose of supplying the magnet bearing.

In addition, it has proven to be advantageous if a capacitor is interposed in parallel between the rectifier and the power converter. By means of a capacitor being interposed, the output voltage is only additionally smoothed.

Furthermore, it has proven to be advantageous if the rectifier is in the form of a controlled rectifier. In the event of the rectifier being in the form of a controlled rectifier, the DC-link voltage can continue to be maintained for a very long period of time in the event of failure of the electrical supply voltage.

In addition, it has proven to be advantageous if capacitors are interposed in parallel between the transformer and the rectifier. As a result, disruptive higher-frequency electrical oscillations generated by the controlled rectifier are filtered out.

In this case it is advantageous to design in particular a machine tool, a production machine and/or a robot to have the device according to the invention since increasingly often magnet bearing arrangements are used in these types of machines, but of course the invention can also be used in other machines.

BRIEF DESCRIPTION OF THE DRAWING

Three exemplary embodiments of the invention are illustrated in the drawing and will be explained in more detail below. In the drawing.

DETAILED DESCRIPTION OF PREFERRED EMBODIMENTS

Figure 1:
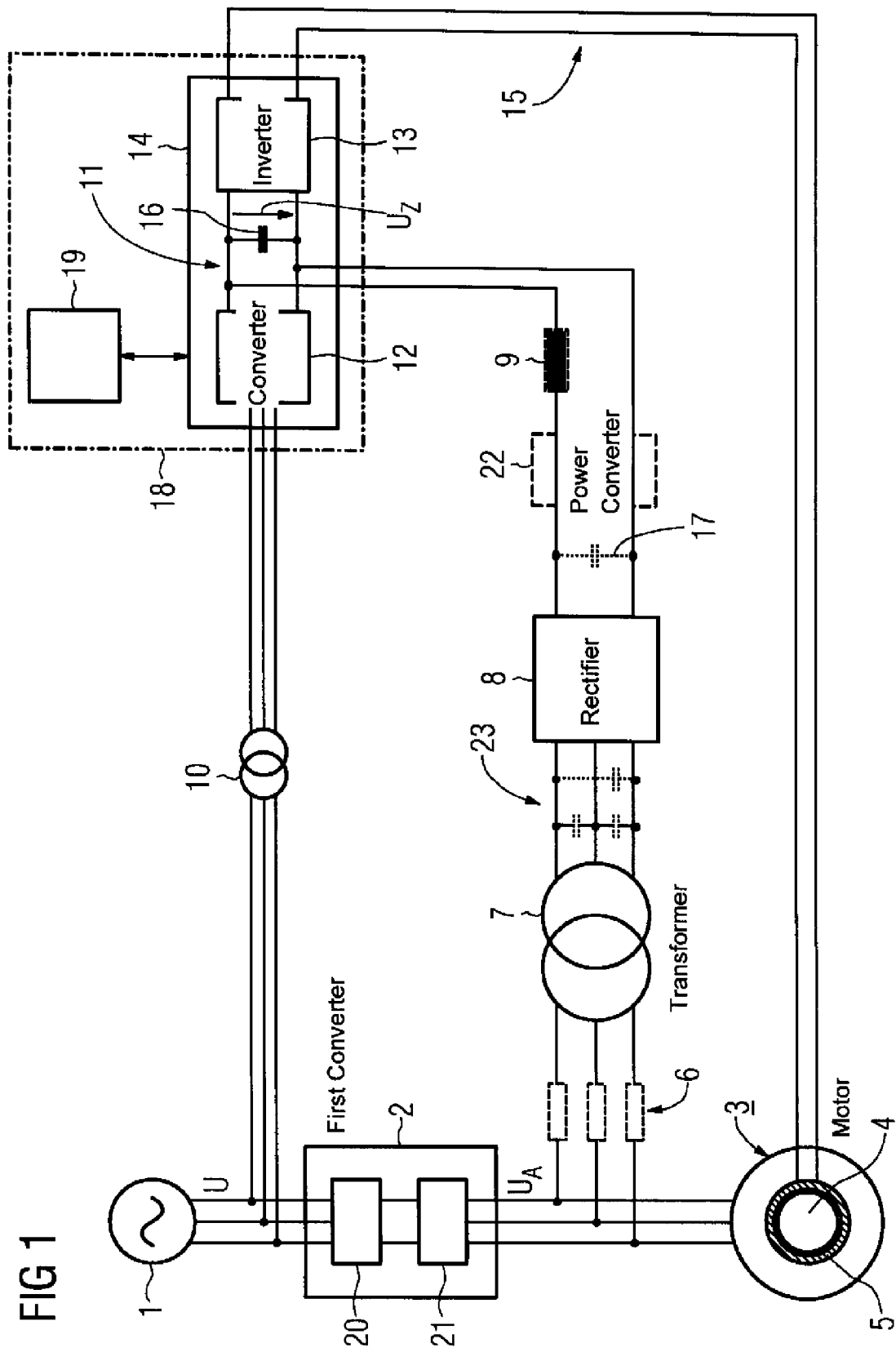
FIG. 1 shows a schematized illustration of the device according to the invention.

FIG. 1 shows a schematized electrical block circuit diagram of the device according to the invention. In this case, for reasons of clarity, only the components which are essential to the understanding of the invention are illustrated in FIG. 1; in particular only a drive unit 18 for driving the magnet bearing for one movement direction (for example X direction) is illustrated. A power supply system 1 is connected to a first converter 2 by means of a three-phase line, which is in turn connected to a motor 3 by means of a three-phase line. The motor 3 has a rotating shaft 4, which is mounted by means of a magnet bearing 5. The three-phase supply voltage U, which is made available by the power supply system 1, is rectified by the first converter 2 initially by means of a first power converter 20 and then inverted again by means of a second power converter 21 and the three-phase AC output voltage $U_A$ is generated. The motor 3 is thus driven by the first converter 2.

In the context of the exemplary embodiment, the motor 3 has a high power, with the result that the supply voltage U and the AC output voltage $U_A$ are in the kilovolts range in the context of the exemplary embodiment.

The magnet bearing 5 is driven by a second converter 14 by means of lines 15 and is thus supplied with electrical energy. In the context of the exemplary embodiment, the second converter 14 is part of a drive unit 18, which has a controller 19 for controlling the converter 14. In this case, the second converter 14 has a power rectifier 12, which generates an DC-link voltage $U_Z$ in a DC-link circuit 11, which DC-link voltage $U_Z$ is in turn correspondingly inverted by a power inverter 13 and used for driving the magnet bearing 5. The magnet bearing 5 is thus supplied with electrical energy. For storage of the energy, the DC-link circuit 11 has a capacitor 16. The second converter 14 in this case functions in the low-voltage range, with the result that the DC-link voltage $U_Z$ fluctuates in a range of several volts to several hundred volts, i.e. is considerably lower than the supply voltage U. Therefore, the supply voltage U is transformed down by means of a matching transformer 10 in order to match it to the voltage level of the second converter 14.

During normal operation, the power supply of the magnet bearing is therefore ensured via the matching transformer 10 and the power supply system 1. In the event of a failure or a fault within the power supply system 1, this results in failure of the supply voltage U, both for the second converter 14 for driving the magnet bearing 5 and for the first converter 2 for driving the motor 3. For this case it is now necessary to ensure that the second converter 14 is still supplied with energy as long as the motor 3 is still rotating, in particular at high speeds. In the event of failure of the supply voltage U, the motor 3 runs down and therefore transfers to the generator operating state and, as in the normal case of the first converter 2, generates the AC output voltage $U_A$, which is in the several kilovolts range (for example 3 kV). According to the invention, the AC output voltage $U_A$ is transformed down by means of a transformer 7 to a voltage level which is of the order of magnitude of the voltage level of an DC-link circuit 11 of the second converter 14. The transformer 7 is connected on the output side to a rectifier 8, which generates a DC voltage on the output side which is used for supplying energy to the electrical DC-link circuit 11 of the second converter 14. The rectifier 8 is connected to the DC-link circuit 11 on the output side for this purpose. If appropriate, the output voltage or the output current of the rectifier 8 can also additionally be smoothed by a coil 9, which is connected in series and which is illustrated by dashed lines in FIG. 1, if necessary.

In the context of a first exemplary embodiment, the rectifier 8 in this case is in the form of an uncontrolled rectifier, i.e. it is designed to have uncontrollable power converter valves such as diodes, for example. The transformer 7 is preferably dimensioned such that, given the presence of the supply voltage U, the voltage on the rectifier side of the transformer is below, in particular just below, the DC-link voltage of the second converter 14. This measure ensures that energy is supplied from the transformer 7 via the rectifier 8 to the DC-link circuit 11 only in the event of failure of the supply voltage U.

In the context of a second exemplary embodiment, however, a power converter 22 is also connected between the rectifier 8 and the DC-link circuit 11, as is indicated by dashed lines in FIG. 1, the power converter 22 being controlled in such a way that, in the event of failure of the electrical supply voltage U, the DC-link voltage $U_Z$ remains constant for as long as possible. If appropriate, it may also be necessary, for additional smoothing of the output voltage of the rectifier 8, to interpose a capacitor 17 in parallel between the rectifier 8 and the power converter 22.

In the context of a further exemplary embodiment, it is also possible, however, for the rectifier 8 to be in the form of a controlled rectifier, which has, for example, controlled electrical valves such as IGBTs or thyristors as the electrical valves, for example.

The output voltage of the rectifier 8 can then likewise be controlled correspondingly in order to keep the DC-link voltage $U_Z$ constant for as long as possible after failure of the supply voltage U. If appropriate, in the context of this exemplary embodiment, it may also be necessary, in order to avoid any disruptive oscillations which may occur in the voltage and/or current which occur during controlled operation of the rectifier 8, to connect capacitors 23 in the form of filters in parallel between the individual phases between the transformer 7 and the rectifier 8.

If the output voltage $U_A$ of the first converter 2 has a DC component, it may, if appropriate, be necessary to connect electrical resistors 6 on the motor side of the transformer 2 in series upstream of the transformer 7. The resistors 6 result in the DC component resulting in this case being limited, so that the transformer 7 does not enter saturation prematurely. This may be necessary, for example, if the motor 3 is in the form of an asynchronous motor whose magnetization current is impressed and whose rotor is at a fixed rotary angle off load. In this case, the output voltage of the converter is a pulse-width-modulated pulse train, which does not change its mathematical sign, with the result that a DC component is produced in the voltage.

Figure 2:
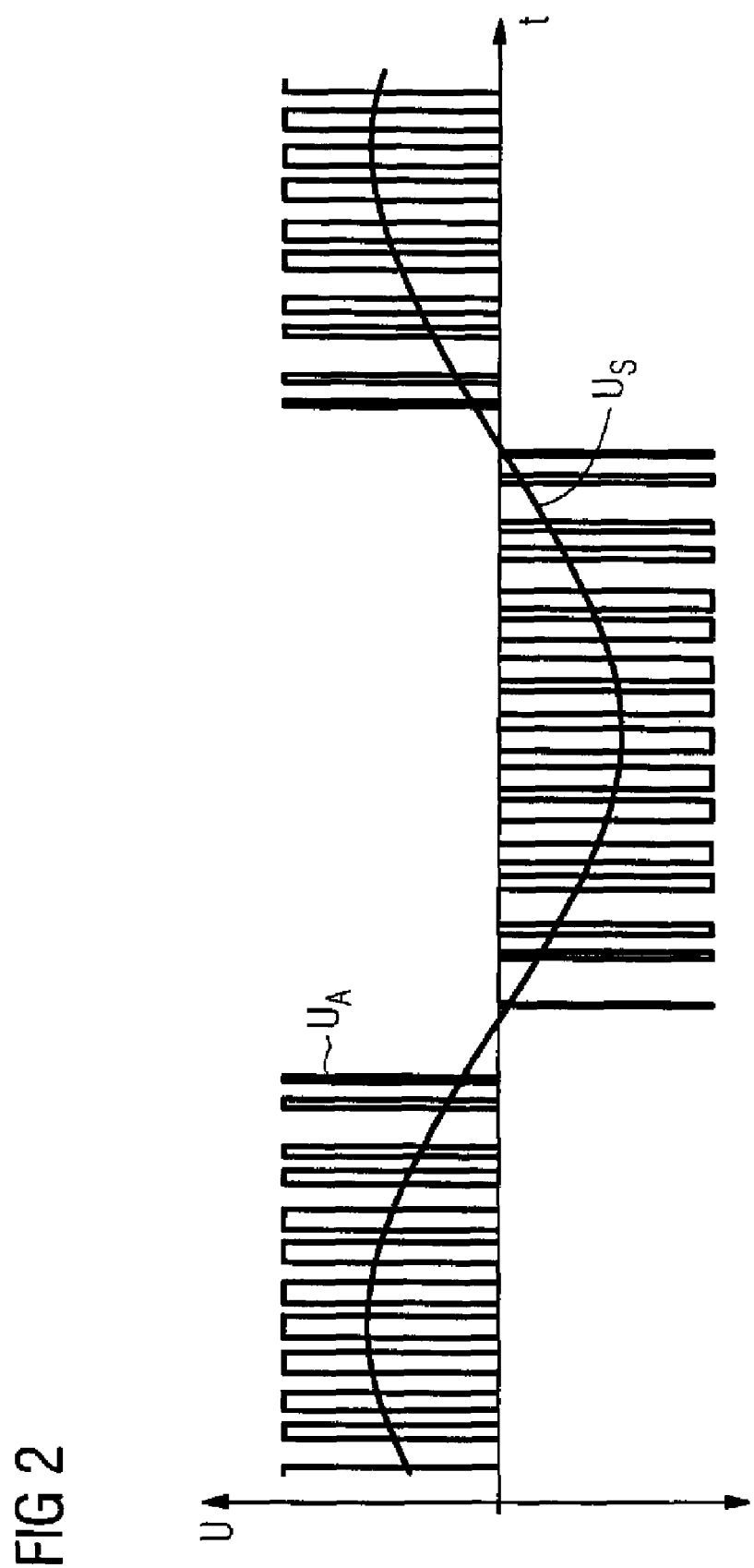
FIG. 2 shows the profile of the AC output voltage in one phase.

Furthermore, the transformer must be dimensioned such that, given the maximum possible AC output voltage $U_A$ of the first converter 2, no saturation of the transformer 7 occurs. The transformer 7 must therefore be dimensioned such that it can transfer the voltage/time area (corresponding to the magnetic flux), which the first converter 2 can generate at a maximum. The voltage/time area results from the number and duration of voltage pulses which follow one another in the same polarity. The smoothed flux-forming voltage $U_F$, which results from the pulse-width-modulated AC output voltage $U_A$ of the first converter 2 illustrated by way of example in FIG. 2, is illustrated correspondingly in FIG. 2. Since the motor 3 is designed for a certain maximum magnetic flux, the maximum voltage/time area of the AC output voltage $U_A$ of the first converter is thus also fixed. This value can be used as the basis for the dimensioning of the voltage/time area of the transformer 7.

It is noted at this juncture that the first converter 2 and/or the second converter 14 can naturally also be in the form of converters which have a so-called current DC-link circuit (instead of a parallel-connected capacitor a series-connected coil is provided as the energy storage element in the DC-link circuit).

FIG. 1 shows, for reasons of clarity, only those components which are essential to the understanding of the invention, in particular only one drive unit 18 for driving the magnet bearing for one movement direction (for example X direction) is illustrated. The drive units for the other movement directions (Y direction, Z direction) are connected to the matching transformer 10, the magnet bearing 5 and the rectifier 8 in a similar way to the drive unit 18. Alternatively, the drive unit 18 can also be designed such that it has not only one individual power inverter 13 but that it has respectively associated further power inverters for driving the other movement directions of the magnet bearing 5, which further power inverters are all supplied with electrical energy by the common DC-link circuit 11.

What is claimed is:

1. A device for supplying uninterrupted electrical power to a magnetic bearing in the event of failure of a supply voltage, comprising:
    a first converter receiving electrical power from the supply voltage and driving a motor, and
    a transformer having an input connected to the motor,
    a rectifier having an input connected to an output of the transformer, and
    a second converter comprising a power rectifier, a DC-link circuit connected to an output of the rectifier, and a power inverter connected to the magnetic bearing,
    wherein the rectifier, in the event of failure of the electrical supply voltage, supplies DC power to the DC-link circuit of the second converter.

2. The device of claim 1, further comprising electrical resistors connected between the input of the transformer and the motor.

3. The device of claim 1, further comprising a coil connected in series between the output of the rectifier and the DC-link circuit.

4. The device of claim 1, wherein the rectifier is configured as an uncontrolled rectifier.

5. The device of claim 1, wherein the transformer is sized so as to prevent saturation as long as an AC output voltage of the first converter is less than a predetermined maximum voltage.

6. The device of claim 1, wherein the transformer is sized so that a voltage at the output of the rectifier is less than a DC-link voltage of the second converter as long as the supply voltage is present.

7. The device of claim 1, further comprising a power converter connected between the output of the rectifier and the DC-link circuit, wherein the power converter is controlled so that, in absence of the supply voltage, a voltage of the DC-link circuit remains substantially constant as long as the motor still rotates with a high rotation speed.

8. The device of claim 7, further comprising a capacitor connected across the output of the rectifier upstream of the power converter.

9. The device of claim 1, wherein the rectifier is configured as a controlled rectifier.

10. The device of claim 9, further comprising capacitors connected across output phases of the transformer upstream of the rectifier.

11. The device of claim 1 for use in a machine tool, a production machine and/or a robot.

* * * * *

UNITED STATES PATENT AND TRADEMARK OFFICE
CERTIFICATE OF CORRECTION

| | | |
|---|---|---|
| PATENT NO. | : 7,928,620 B2 | Page 1 of 1 |
| APPLICATION NO. | : 12/298822 | |
| DATED | : April 19, 2011 | |
| INVENTOR(S) | : Joachim Denk, Dietmar Stoiber and Bernd Wedel | |

It is certified that error appears in the above-identified patent and that said Letters Patent is hereby corrected as shown below:

Title page Item [56] References Cited, FOREIGN PATENT DOCUMENTS, column 2:

replace: "DE 195 08 849" with -- DE 195 06 849 --.

Signed and Sealed this
Thirty-first Day of May, 2011

David J. Kappos
*Director of the United States Patent and Trademark Office*